United States Patent [19]

Brockmann

[11] 4,289,611

[45] Sep. 15, 1981

[54] MULTI-STAGE CYCLONE SEPARATOR

[75] Inventor: Heinz Brockmann, Homburg, Fed. Rep. of Germany

[73] Assignee: Klockner-Humboldt-Deutz Akt., Cologne, Fed. Rep. of Germany

[21] Appl. No.: 146,274

[22] Filed: May 5, 1980

[30] Foreign Application Priority Data

May 10, 1979 [DE] Fed. Rep. of Germany ....... 2918765

[51] Int. Cl.³ ............................................. B01D 45/12
[52] U.S. Cl. .................................... 209/144; 55/345; 55/347; 55/348; 55/457
[58] Field of Search ................. 55/456, 457, 347, 348, 55/343, 344–346; 209/144

[56] References Cited

U.S. PATENT DOCUMENTS

| | | | |
|---|---|---|---|
| 1,735,298 | 11/1929 | Pfeffen | 55/343 |
| 2,732,032 | 1/1956 | Sandison. | |
| 3,520,114 | 7/1970 | Pall et al. | |
| 3,902,876 | 9/1975 | Moen et al. | 122/488 |
| 3,915,679 | 10/1975 | Roach et al. | 55/457 |
| 4,008,059 | 2/1977 | Monson et al. | 55/488 |
| 4,162,906 | 7/1979 | Sullivan et al. | 55/457 |

FOREIGN PATENT DOCUMENTS

| | | | |
|---|---|---|---|
| 1576515 | 10/1972 | Fed. Rep. of Germany. | |
| 1626147 | 6/1974 | Fed. Rep. of Germany. | |
| 1019674 | 11/1952 | France | 55/348 |
| 626809 | 8/1978 | U.S.S.R. | 55/348 |

*Primary Examiner*—Bernard Nozick
*Attorney, Agent, or Firm*—Watson, Cole, Grindle & Watson

[57] ABSTRACT

A vortex separator, operating as a dust filter system for air intake machines, such as gas turbines and other internal combustion engines, includes dust filters having first and second casings arranged coaxially with helical bladed inserts mounted within the upstream ends of the casings, and an air outlet connector extending coaxially of the downstream end of the second casing. The downstream end of the first casing surrounds and forms an annular space with the upstream end of the following casing, and the downstream end of such following casing surrounds and forms an annular space with the upstream end of the air outlet connector.

4 Claims, 1 Drawing Figure

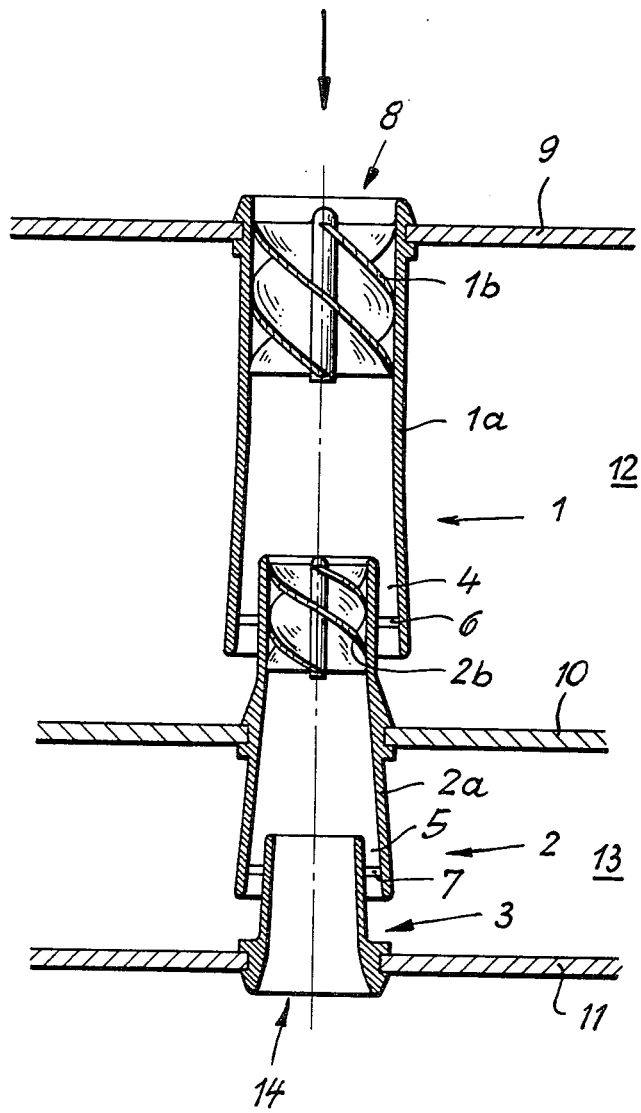

MULTI-STAGE CYCLONE SEPARATOR

BACKGROUND OF THE INVENTION

This invention relates to a vortex separator operating as a dust particle separator to reduce equipment maintenance, as in engine intake air filters, especially for gas turbines and other internal combustion engines.

Multi-stage cyclone and vortex separators are usable as dust filters whenever contamination of the air with dust particles is uneven and the degree of filtering is to be uniformly high for all components. Such separators function to reduce equipment maintenance, as in engine intake air filters, especially for gas turbines and other internal combustion engines operating near the ground in especially dry and dusty conditions, such as during the operation of construction-type vehicles or military-type vehicles. Moreover, separators of the centrifugal type operating as dust filters may be designed to fulfill special requirements regarding low pressure losses and the occupation of small spaces when used to reduce equipment maintenance.

German Offenlegungsschrift No. 1 576 517 discloses a cyclone separator of the centrifugal-type operating as a dust filter and having two cyclone inserts. The air to be filtered enters the separator and is rotated in a first direction after which it is reverted twice in counterdirections as the air moves axially through an annular space, and is finally freed of its rotation in a flow diverter.

A considerable disadvantage of this type of arrangement lies in the twice reversal of the direction of flow and in the concentric counterflow in the annular space which causes a considerable loss in pressure. The second cyclone insert lying downstream of the first cyclone insert decreases the rotational impulse of the air current and thus does not contribute to the radial acceleration of the dust particles which is required for separation.

Centrifugal-type dust filter systems of this nature which combine the cyclone or spiral shaped dust filters with a system of different deflecting devices, only becomes suitable as a dust filter system upon the inclusion of an additional feature such as an oil bath, paper or fiber filter as a fine-mesh filter.

However, these fine-mesh filters present a drawback in that the separated contaminations remain in the filter medium. The filters must therefore be replaced periodically which is time consuming and costly and result in equipment downtime when used as dust filters with an internal combustion engine. Moreover, these filters require a considerably large construction volume relative to centrifugal dust filters having the same air throughout and loss of pressure.

SUMMARY OF THE INVENTION

It is therefore an object of the present invention to provide a multi-stage vortex-separator which operates as a simple centrifugal dust filter system requiring little maintenance, the stages of which being made optimal for various dust particle sizes so as to avoid the need for series-connected, fine-mesh filters. The present system, which eliminates flow reversal of the air to be filtered, causes only slight losses in pressure, includes a minimum of construction elements and may be installed as a single unit for increasing throughput without the need to segregate the system into individual units.

In accordance with the invention, first and second dust filters each include a casing and a cyclone insert located within the upstream end thereof, and an air outlet connector projecting outwardly of the downstream end of the last filter. The casings and the connector are coaxially disposed, and the downstream end of each filter surrounds the upstream end of the following filter and form annular spaces therewith, while the downstream end of the last filter surrounds the upstream end of the connector and forms a further annular space therewith.

As a further feature of the invention, the helical bladed inserts may have blades oriented for effecting air rotation in the same direction, and the blades of the insert contained within the casing of the following filter may have a pitch greater than the blade pitch of the insert in the casing of the first filter to thereby relatively increase the swirl of the air entering the second filter.

The twist of the air current therefore is increased gradually with the simultaneous decrease in the cross-section of the flow so that separation of ever finer dust particles is made possible as the largest dust particles thereafter exit the first annular space and still smaller dust particles are discharged through the following annular air space. The casings comprise straight coaxial pipe sections so that the pressure drop of the air flowing therethrough is reduced as compared to the air flowing through cyclone separators which require a reversal of the flow.

Dust collectors of the inertial type, such as a vortex or cyclone separator, subjects the air or gas containing dust particles to a whirl so as to drive the suspended particles to a collecting surface. The basis of such device is that the dust particles have greater inertia than the air or gas. And, the radial acceleration on a dust particle in a cyclone is caused by the force resulting from centrifugal force and air resistance, so that with the same track radius and the same momentary velocity for dust particles of relatively the same shape and density, such particles will radially increasing substantially to the their size. Therefore, the larger dust particles will first reach the wall of the first filter casing, and are separated as they exit through the first annular space. The remaining, smaller dust particles must experience, on a corresponding track radius, an equally large acceleration in order to reach the wall of the second casing at the same velocity in order to be separated there. Thus, the centrifugal force should be increased. According to the invention, an increase in centrifugal force can be effected by the provision of a higher pitch for the blades of the insert of the second filter casing, to thereby increase the rotational impulse of the air current caused in the first dust filter. Moreover, the diameter of the second filter casing is less than the diameter of the first filter casing, so that the path distance of the dust particles to the casing wall is decreased in the second dust filter. In such manner, dust filters of comparable length are made optimal for various dust particle sizes.

The degree of filtering by the combining of several dust filters according to the invention is greater than the degree of filtering capable of being achieved with an aggregate of several mutually, equally oriented dust filters or with dust filters oriented in a variable rotational sense.

The first and second dust filter casings as well as the air outlet connector comprise straight cylindrical pipes which interengage with decreasing diameter between the inlet and outlet ends of the dust particle separator formed by the coaxial disposition of the pipes.

When several cyclone separators according to the invention are used together so that the air outlet connectors lead into a common collecting chamber, such connectors may be in the form of air diffusers for decreasing the flow velocity and for keeping the mixing loss to a minimum.

Another feature of the invention includes the provision of radial support elements located in the first and second annular spaces for interconnecting the first and second filter casings together and for interconnecting the second filter casing and the air outlet connector together. The centrifugal-type dust filter system according to the invention therefore is formed as a rigid unit which may be mounted vertically between horizontal walls at the inlet and outlet ends of the filter system thereby forming a single collecting chamber, or which may be additionally mounted by means of a horizontal wall engaging the second dust filter casing so as to divide the air collecting chamber into two chambers. The large dust particles therefore exit through the first annular space into the first chamber, while the smaller dust particles exit into the second chamber through the second annular space. In such manner, the dust particles may be removed continuously or periodically from one or both collection chambers.

DETAILED DESCRIPTION OF THE INVENTION

The vortex separator according to the invention, shown in vertical section in the single drawing FIGURE, includes a first dust filter, generally designated 1, which includes a cylindrical casing 1a and a helical bladed insert 1b fixedly mounted within the upstream end thereof. A second dust filter, generally designated 2, is located downstream of the first filter in the direction of flow and includes a cylindrical casing 2a and a helical bladed insert 2b fixedly mounted within the upstream end thereof. An air outlet connector, generally designated 3, and formed as an air diffuser in any normal manner, projects outwardly of the downstream end of casing 2a.

The downstream end of casing 1a surrounds and has a large diameter than the upstream end of casing 2a to thereby form a first annular space 4 therewith. And, the downstream end of casing 2a surrounds and has a larger diameter than the upstream end of air outlet connector 3 to thereby form a second annular space 5 therewith. The first and second casings are interconnected by a plurality of radially disposed connecting elements 6 extending between the respective downstream and upstream ends thereof in space 4. Similarly, the second filter casing and the connector are interconnected by a plurality of connecting elements 7 extending radially between the respective downstream and upstream ends thereof in annular space 5.

Dust filter 1 has an inlet 8 for the air or gas containing dust particles to be separated by the vortex separator according to the invention. Dust filter 1 may be supported by a horizontal wall 9 in engagement with casing 1a at the upstream end thereof, while the second filter is supported by a horizontal wall 10 located downstream of inner space 4 and engaging casing 2a so as to form a dust collection chamber 12 together with wall 9. A wall 11 engages air outlet connector 3 at the downstream end thereof, and is disposed downstream of annular space 5 so as to form together with wall 10 another dust collection chamber 13. It should be pointed out, however, that wall 10 may be eliminated so that a single collection chamber is formed between walls 9 and 11.

The air or gas containing dust particles to be separated enters first dust filter 1 through inlet opening 8 and is given a whirl while flowing through cyclone insert 1b. The larger dust particles, which have a greater inertia than the gas and than the smaller dust particles, first reach the inner surface of casing 1a while the gas containing the remaining dust particles flows axially through the casing. These large dust particles therefore exit through annular space 4 and are collected in chamber 12 from which they may be removed continuously or periodically in any normal manner. The principle flow of air containing dust particles reaches second dust filter 2 and is given an increased whirl as it passes through cyclone insert 2b. Both cyclone inserts have blades oriented for effecting rotation in the same direction, although the blades of cyclone insert 2b have a pitch greater than the blade pitch of the first cyclone insert 1b. A further secondary air current is therefore produced and has a higher velocity than the secondary air current produced in cylindrical casing 1a. This further secondary air current contains smaller dust particles as compared to those large dust particles which had exited annular space 4. Similarly, as in casing 1a, the larger of the dust particles contained in the air passing through cyclone 2b first reach the inner surface of casing 2a by centrifugal force and exit through annular space 5 into collection chamber 13 from which they are removed continuously or periodically in some suitable manner. The remaining still smaller dust particles contained in the air flowing axially through the cyclone separator exits air outlet connector 3 through outlet opening 14.

As described hereinabove, both casings generally comprise straight cylindrical pipes, casing 1a having a diameter larger than that of casing 2a, and casing 2a having a diameter larger than that of the air outlet connector. Also, connector 3 typically comprises an air diffuser.

Obviously, many modifications and variations of the present invention are made possible in the light of the above teachings. For example, casings 1a, 2a and air outlet connector 3 may be produced as a single unit as, for example, by injection molding. It is therefore to be understood that within the scope of the appended claims, the invention may be practiced otherwise than as specifically described.

What is claimed is:

1. A vortex separator, operating as a dust filter system for air intake machines, such as gas turbines and other internal combustion engines, comprising dust filters including first and second casings arranged coaxially and having upstream and downstream ends, said upsteam end of said first casing having a predetermined diameter and said upstream end of said second casing having a diameter less than said predetermined diameter, first and second helical bladed inserts respectively mounted within and having corresponding diameters to said upstream ends of said casings, said inserts having blades oriented for effecting air rotation in the same direction, said blades of said second insert having a pitch greater than the blade pitch of said first insert for increasing the swirl of the air entering said second casing, an air outlet connector having upstream and downstream ends and extending coaxially of said downstream end of said second filter, said upstream end of said connector having a diameter less than said upstream end of said second casing, said downstream end of said first casing surrounding and having a larger diameter than said upstream end of said second casing to thereby form a first annular space therewith, said downstream end of said second casing surrounding and having a larger diameter than said upstream end of said air outlet connector to thereby form a second annular space therewith, whereby air containing dust particles of various grain sizes enters said upstream end of said first filter and is subjected to a centrifugal force by said first insert, the dust particles having larger grain sizes first impacting against the inner wall of said first casing and thereby exiting through said first annular space, the dust particles having relatively smaller grain sizes entering said upstream end of said second filter and being subjected to a further centrifugal force by said second insert, the dust particles having grain sizes smaller than said larger sizes first impacting against the inner wall of said second casing and thereby exiting through said second annular space, the dust particles having grain sizes still smaller than said smaller sizes being discharged through said outlet connector.

2. The cyclone separator according to claim 1, wherein radially disposed support elements are provided in said annular spaces for interconnecting said filters together and said second casing and said air connector together.

3. The cyclone separator according to claim 2, wherein at least a pair of spaced walls respectively engage said upstream end of said first casing and said downstream end of said air outlet connector for forming at least one dust collection chamber for the exiting dust particles.

4. The cyclone separator according to claim 3, wherein another wall spaced between said pair of walls engages said second casing between said ends thereof for forming a pair of dust collection chambers for the exiting dust particles.

* * * * *